United States Patent [19]

Breitscheidel et al.

[11] Patent Number: 4,826,552
[45] Date of Patent: May 2, 1989

[54] PROCESS FOR THE PRODUCTION OF MULTIPLE-LAYER MOLDINGS

[75] Inventors: Hans-Ulrich Breitscheidel, Siegburg; Karlo Klaar, Troisdorf-Sieglar; Paul Spielau, Troisdorf-Eschmar, all of Fed. Rep. of Germany

[73] Assignee: Dynamit Nobel Aktiengesellschaft, Troisdorf, Fed. Rep. of Germany

[21] Appl. No.: 43,964

[22] Filed: Apr. 29, 1987

[30] Foreign Application Priority Data

Apr. 29, 1986 [DE] Fed. Rep. of Germany ....... 3614566

[51] Int. Cl.⁴ ............................................. B32B 31/20
[52] U.S. Cl. .................... 156/221; 156/245; 156/309.9; 156/322; 428/319.9; 428/424.8
[58] Field of Search ............... 156/221, 309.9, 322, 156/245; 428/319.7, 319.9, 424.8

[56] References Cited

U.S. PATENT DOCUMENTS 3,352,742 11/1967 Zunich et al. ................. 156/221 X
4,478,660 10/1984 Landler et al. .............. 428/319.9 X
4,659,618 4/1987 Yazaki et al. ................ 428/319.9 X
4,692,373 9/1987 Welz et al. ................... 428/424.8 X

FOREIGN PATENT DOCUMENTS 2303481 8/1974 Fed. Rep. of Germany.
2545700 4/1977 Fed. Rep. of Germany.

Primary Examiner—Robert A. Dawson
Attorney, Agent, or Firm—Antonelli, Terry & Wands

[57] ABSTRACT

A process for the production of multiple-layer moldings from a substrate, member based on polypropylene and an elastomer foam is provided wherein lamination of the foam to the substrate member and shaping of the polypropylene take place in one working step.

13 Claims, 1 Drawing Sheet

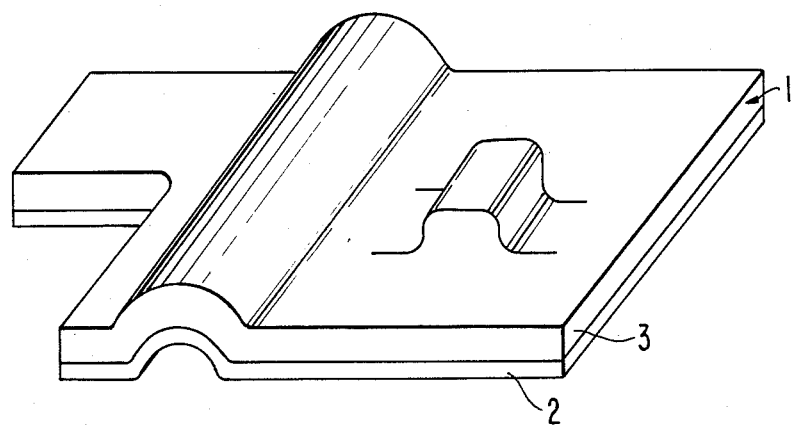

PROCESS FOR THE PRODUCTION OF MULTIPLE-LAYER MOLDINGS

This invention relates to a process for the production of multiple-layer moldings wherein a polypropylene sheet is preheated to 180° to 220° C., this preheated sheet and a non-heated foam layer are inserted into a press mold and the sheet and layer are molded under pressure to produce a multi-layered molded composite or molding.

Multiple-layer moldings of polypropylene panels and foams are known. They are utilized especially in automobile construction as noise-damping covers or enclosures particularly in the engine zone.

A process for the production of multiple-layer moldings has been known from DOS No. 23 03 481. According to this process, a substrate member, for example of glass-fiber-reinforced polypropylene, can be joined to rigid foam materials under relatively low pressure forces of 3-20 bar and can be molded to a minor degree.

DOS No. 25 45 700 discloses a similar process wherein a substrate member of, for example, glass-fiber-reinforced polypropylene and a thermoplastic foam are each heated to their forming temperature and are together molded and bonded in a press. However, this process is usable only for pressures of below 2 bar, and in spite of these low pressures, irreversible damage to the thermoplastic foam cannot be avoided.

In these conventional methods, only very minor shaping of the substrate member can be achieved. In particular, it is not possible to manufacture moldings wherein the substrate member exhibits three-dimensional molded configurations with narrow radii, ribs, or varying wall thicknesses. However, there is great need for multi-ply moldings having a substrate member on the basis of polypropylene, especially glass-fiber-reinforced polypropylene, with a foam layer wherein the substrate member also exhibits more pronounced molded configurations in correspondence with its intended usage.

According to the state of the art, such multiple-layer moldings are produced by shaping a panel of polypropylene, especially also glass-mat-reinforced polypropylene, in a molding press under pressure and at a temperature of 190°-200° C. by compression molding or flow-molding into a single-layer polypropylene molding, whereupon the molding is bonded by cementing or gluing, to obtain the multi-ply molding, with a likewise finished shaped foam molding, for example, a molding of polyurethane foam. By 'compression molding' there is understood a molding technique of thermoplastic panels by which only a low flowing of the thermoplastic compound is performed. Therefore, the panels in their outer shape must correspond so exactly as possible to the outer shape of the later on achieved moldings. By 'flow-molding' there is understood a molding technique of thermoplastic panels, at which a deeper flow of the thermoplastic compound can be achieved. It is not necessary that such panels at flow molding are adapted exactly to the later on achieved molding shape; only the volume and mass, resp., of the panel must correspond to the volume and mass of the molding.

In spite of the disadvantages connected with cementing or gluing such as lack of adhesive strength, lack of resistance to chemicals and to water of the cemented bond, thus far it has been impossible to find a process for direct bonding, with adhesive strength, of foams and polypropylene moldings over their entire surfaces with the substrate member showing a relatively pronounced molded configuration. Furthermore, an additional working step is required for the cementing. It is an object of the invention to produce a molding of a precut polypropylene blank and a precut blank of molding of synthetic resin foam wherein the degree of shaping of the substrate member is not subject to narrow limits and wherein a flat direct bond is established without the use of adhesives in a simple way with high adhesive strength.

This object is attained by the invention in that it provides a process wherein a substrate member of polypropylene is directly bonded to an elastomer foam layer under a pressure of about 20 to 120 bar.

It has been found surprisingly that a precut blank of an elastomer foam and, respectively, a molding of an elastomer foam is not damaged in spite of the high pressures employed—during compression molding at about 20 bar to 40 bar and up to 120 bar during flow-molding—so that the foam retains its original shape and elastic memory after the press molding step. The adhesive bonding strength between the elastomer foam and the polypropylene substrate is adequate for most usage purposes, without the utilization of additional adhesives such as cements or other resinous materials or adhesion promoters; at the same time, the bond is resistant to chemicals and water.

An especially suited material for the elastomer foams employed proved to be, in particular, polyurethane elastomer foams, especially those based on polyester urethanes and/or polyether urethanes.

The elastomer foam preferably has a foam density of 20-100 kg/m$^3$, especially 23-50 kg/m$^3$. The thickness of the elastomer foam layer is preferably 5-50 mm.

The term "polypropylene" as used herein is understood to mean, according to the invention, also mixtures with other polymers, as well as copolymers based on polypropylene, in each case optionally with further auxiliary agents and conventional fillers and additives, particularly with glass fibers or glass fiber mats.

It is also possible according to the invention to insert several precut polypropylene panels in entirely or partially overlapping arrangement in the press mold.

It has been found surprisingly that an especially firm adhesive direct bond is obtained when using polypropylene containing a crosslinking agent, * but not as yet sustantially crosslinked. In particular, a polypropylene has proven itself in this connection which has an initial degree of crosslinking of below 5%, according to DOS No. 33 27 149. **

\* especially an alkoxysilane compound and an organic perioxide,
\*\* (U.S. Ser. No. 003,016, filing date Jan. 13, 1987)

Crosslinking of the polypropylene takes place advantageously by storing the finished, multi-ply molding under hot conditions in the presence of moisture, especially at elevated temperatures of not more than 140° C. The degree of cross-linking is determined by the indication of the percentage of matter insoluble in "decahydronaphthalene" (decalin), i.e. by heating for 20 hours in boiling "decalin" under reflux, i.e. the content of insoluble gel in the crosslinked material is determined.

Advantageously, the foams utilized are elastomer moldings or precut elastomer blanks sealed with a skin or sealed surface on one or both sides. The thus-produced, multiple-layer moldings are also water-repellant on the foam surface.

The process of this invention for producing multiple-layer moldings results—especially when using crosslinkable polypropylene substrate panels—in composite parts showing dimensional stability under heat, wherein the elastomer foam is bonded to the polypropylene substrate with adhesive bonding strength and resistant to chemicals and water. At the same time, this process constitutes a considerable saving of working steps, and thus expenses, as compared with conventional cementing or gluing methods with a separate molding step.

It is possible by means of the process of this invention to produce moldings, the substrate member of which also exhibits relatively pronounced molded configurations. In particular, three-dimensional shapes can be realized with narrow radii of curvature, as well as ribs and very differing wall thicknesses.

In the production of multi-ply moldings, molding pressures can be utilized of between 20 and 40 bar in order to attain a desireable compression molding with low flow.

The special advantages of the process of this invention, however, become more apparent especially at higher pressures of 50–120 bar at which, during the molding step, the substrate member is shaped by flow-molding. Under these very high compression forces, multiple-layer moldings can be produced, the substrate member of which exhibits even complicated surface configurations, especially ribs, etc., with narrow radii of curvature, very differing wall thicknesses, etc.

The process of this invention will be described in greater detail with reference to the following examples as well as to the accompanying single figure of the drawings.

EXAMPLE 1

A mixture was prepared in a powder mixer with rotar at about 25° C. from 100 parts by weight of a propylene-homopolymer (MFI (190/5) 0,1 g/10 min.), to which antioxidants were added in the usual amount, 2 parts by weight of vinyltrimethoxysilane, and 0.4 parts by weight of dicumyl peroxide. This mixture was then plasticized in a single-screw extruder, leaving the extruder die at a temperature of about 22° C. in band form, and reinforced with a glass mat. Thereafter, the degree of crosslinking of the freshly extruded band was determined.

A planar precut blank having a thickness of about 1.7 mm of the glass-mat-reinforced, crosslinkable polypropylene substrate with a glass content of 35% and a degree of crosslinking of below 5% is heated in an infrared tunnel furnace with cyclic operation to a temperature of 200° C. The crosslinkable polypropylene utilized for the polypropylene substrate corresponds to Example 1 of DOS No. 33 27 140. The heated precut substrate is subsequently placed, together with a preformed, skin-sealed polyurethane elastomer foam layer member, into a quick-closing press at a temperature corresponding to ambient temperature. The polyurethane elastomer foam based on a polyester urethane had a foam density of 30 kg/cm$^3$ with an average thickness of 18 mm. The molding surfaces in contact with polypropylene substrate were set to a temperature of 70° C.; whereas the top mold surfaces had a temperature of 30° C.

The press was closed immediately after introduction of the precut blanks at a speed of about 600 mm/s. The composite was compression molded under a pressure of about 30 bar and a pressing period of about 15 s, during which step the polypropylene substrate member assumed the contour of the molding surfaces. After removal from the mold, the elastomer foam was restored completely to its original shape. The laminating strength surpassed the inherent strength of the polyurethane foam. Subsequently, the polypropylene substrate member of the multi-ply molding was completely crosslinked by storing under hot conditions at 140° C. in a moisture-chamber atmosphere over a period of 3 hours; the degree of crosslinking was about 50%.

EXAMPLE 2

A planar precut blank of a glass-mat-reinforced, crosslinkable polypropylene substrate as in Example 1 having a thickness of 3.4 mm, a glass content of 40%, and a degree of crosslinking of below 5% was adjusted to a temperature as in Example 1 and placed together with a non-preheated polyurethane elastomer foam layer member into a rapidly closing press. The polyurethane elastomer foam based on polyether urethanes exhibited a thickness of 24 mm with a foam density of 32 kg/m$^3$. By subsequent press molding under 90 bar over a period of 25 s, the composite was flow-molded, during which step the polypropylene substrate member filled out the press mold completely. After removal from the mold, no damage to the polyurethane elastomer foam could be perceived. Crosslinking of the polypropylene then took place in accordance with Example 1.

EXAMPLE 3

Two planar precut blanks of a glass-fiber-reinforced, crosslinkable polypropylene substrate as in Example 1 having a thickness of 1.7 mm, a glass content of 35%, and a degree of crosslinking of below 5% were set at a temperature as in Example 1 and placed together with a non-preheated polyurethane elastomer foam layer member into a quickly closing press. The polyurethane elastomer foam based on polyether urethanes had a thickness of 30 mm with a foam density of 35 kg/m$^3$. By subsequent press molding under 110 bar over a time period of 20 s, the composite was extrusion-molded, the polypropylene substrate member filling out the press mold completely. After removal from the mold, no damage to the polyurethane elastomer foam could be detected. Subsequently, the polypropylene was crosslinked as in Example 1.

The sole FIGURE of drawings shows a multiple-layer molding 1 according to this invention with an extruded polypropylene substrate 2 and a polyurethane elastomer foam on polyether basis, denoted by 3, as produced in Example 2.

The moisture content, i.e. H$_2$O, and the temperature in the moisture chamber, are not critical. A higher temperature and a higher moisture content, however, effect a quicker cross-linking than a lower temperature and a low moisture content.

What is claimed is:

1. A process for the production of multiple-layer moldings with a substrate member based on polypropylene and with a foam layer, wherein, as the substrate member, an essentially planar precut blank of a sheet or panel based on polypropylene is heated to a temperature of 180°–220° C., said heated precut blank and a non-preheated foam layer in the shape of a flat precut blank or molding are inserted in a press having an upper mold portion and a lower mold portion, and the substrate member and the foam layer are simultaneously molded under pressure to produce a multiple-layer molding and are directly and adhesively bonded together, characterized in that an elastomer foam is utilized for the foam layer, the molding is effected under a pressure of about 20-120 bar, the precut blank for the substrate member is made from a crosslinkable, but essentially non-crosslinked polypropylene containing a crosslinking agent, and after removing the multiple-layer molding from the mold, crosslinking of the polypropylene is completed by storage, optionally at elevated temperatures of up to 140° C., in the presence of moisture.

2. A process according to claim 1, characterized in that the substrate member is made from a glass-mat-reinforced polypropylene having a glass fiber content of between 20 and 60% by weight.

3. A process for the production of multiple-layer moldings with a substrate member based on polypropylene and with a foam layer, wherein, as the substrate member, an essentially planar precut blank of a sheet or panel based on polypropylene is heated to a temperature of 180°-220° C., said heated precut blank and a non-preheated foam layer in the shape of a flat precut blank or molding are inserted in a press having an upper mold portion and a lower mold portion, and the substrate member and the foam layer are simultaneously molded under pressure to produce a multiple-layer molding and are directly and adhesively bonded together, characterized in that an elastomer foam is utilized for the foam layer, the molding is effected under a pressure of about 20-120 bar, and the mold portions are set at differing temperatures, wherein the mold portion in contact with the substrate member during molding exhibits a temperature that is higher by at least 20° C. than the mold portion in contact with the foam layer.

4. A process according to claim 3, characterized in that the substrate member is made from a glass-mat-reinforced polypropylene having a glass fiber content of between 20 and 60% by weight.

5. A process for the production of multiple-layer moldings with a substrate member based on polypropylene and with a foam layer, wherein, as the substrate member, an essentially planar precut blank of a sheet or panel based on polypropylene is heated to a temperature of 180°-220° C., said heated precut blank and a non-preheated foam layer in the shape of a flat precut blank or molding are inserted in a press having an upper mold portion and a lower mold portion, and the substrate member and the foam layer are simultaneously molded under pressure to produce a multiple-layer molding and are directly and adhesively bonded together, characterized in that an elastomer foam is utilized for the foam layer, the molding is effected under a pressure of about 20-120 bar, and the mold portion in contact with a substrate member during molding has a temperature of about 50° to 80° C.

6. A process according to claim 5, characterized in that an open-cell flexible polyurethane foam is utilized as the elastomer foam.

7. A process according to claim 6, characterized by using, as the elastomer foam, a polyester urethane foam or a polyether urethane foam having a foam density of 20-100 kg/m$^3$.

8. A process according to claim 5, characterized by using a precut blank of elastomer foam having a thickness of 5-50 mm.

9. A process according to claim 5, characterized by using an elastomer foam layer having a unilateral or bilateral surface seal, especially in the form of a very thin, compact skin produced by superficial melting of the foam.

10. A process according to claim 5, characterized by using a precut blank for the substrate member having a thickness of about 1-5 mm.

11. A process for the production of multiple-layer moldings with a substrate member based on polypropylene and with a foam layer, wherein, as the substrate member, an essentially planar precut blank of a sheet or panel based on polypropylene is heated to a temperature of 180°-220° C., said heated precut blank and a non-preheated foam layer in the shape of a flat precut blank or molding are inserted in a press having an upper mold portion and a lower mold portion, and the substrate member and the foam layer are simultaneously molded under pressure to produce a multiple-layer molding and are directly and adhesively bonded together, characterized in that an elastomer foam is utilized for the foam layer, the molding is effected under a pressure of about 20-120 bar, and for the formation of the substrate member, several precut blanks based on polypropylene are layered one upon the other, especially after preheating and are inserted in the mold.

12. A process according to claim 11, characterized in that the precut blanks based on polypropylene are compression molded together with precut blanks or moldings of elastomer foam under a pressure of 20-40 bar.

13. A process for the production of multiple-layer moldings with a substrate member based on polypropylene and with a foam layer, wherein, as the substrate member, an essentially planar precut blank of a sheet or panel based on polypropylene is heated to a temperature of 180°-220° C., said heated precut blank and a non-preheated foam layer in the shape of a flat precut blank or molding are inserted in a press having an upper mold portion and a lower mold portion, and the substrate member and the foam layer are simultaneously molded under pressure to produce a multiple-layer molding and are directly and adhesively bonded together, characterized in that an elastomer foam is utilized for the foam layer, the molding is effected under a pressure of about 20-120 bar, and precut blanks based on polypropylene are shaped together with the precut blanks or moldings of elastomer foam under pressure of 50-120 bar.

* * * * *